(12) United States Patent
Sanada et al.

(10) Patent No.: US 7,007,292 B2
(45) Date of Patent: Feb. 28, 2006

(54) DISK CARTRIDGE DEVICE OPERATIVE WITH DISK CARTRIDGES OF DIFFERENT SIZES AND HEIGHT

(75) Inventors: Yotaro Sanada, Tokyo (JP); Yoshio Kusui, Kanagawa (JP); Naohiro Netsu, Tokyo (JP)

(73) Assignee: Sony Corporation, (JP)

( * ) Notice: Subject to any disclaimer, the term of this patent is extended or adjusted under 35 U.S.C. 154(b) by 69 days.

(21) Appl. No.: 10/802,847

(22) Filed: Mar. 18, 2004

(65) Prior Publication Data

US 2004/0177364 A1 Sep. 9, 2004

Related U.S. Application Data

(62) Division of application No. 09/711,274, filed on Nov. 10, 2000, now Pat. No. 6,741,537.

(30) Foreign Application Priority Data

Nov. 12, 1999 (JP) .............................. P11-323228

(51) Int. Cl.
*G11B 23/03* (2006.01)
(52) U.S. Cl. ...................................... 720/728; 360/133
(58) Field of Classification Search ................ 360/133; 720/616, 615, 630, 728
See application file for complete search history.

(56) References Cited

U.S. PATENT DOCUMENTS

| 3,845,502 | A | | 10/1974 | Paus |
| 4,185,314 | A | * | 1/1980 | Hatchett et al. ............ 360/133 |
| 4,669,009 | A | | 5/1987 | Naoi et al. |
| 4,972,278 | A | | 11/1990 | Hara et al. |
| 5,091,815 | A | | 2/1992 | Suzuki |
| 5,325,257 | A | * | 6/1994 | Akiyama et al. ........... 360/133 |
| 5,812,511 | A | | 9/1998 | Kawamura et al. |
| 5,898,659 | A | * | 4/1999 | Goto .......................... 720/656 |
| 6,057,995 | A | * | 5/2000 | Yamashita et al. .......... 360/133 |
| 6,307,712 | B1 | | 10/2001 | Meguro et al. |
| 6,603,725 | B1 | * | 8/2003 | Sanada et al. .............. 720/616 |
| 6,700,851 | B1 | * | 3/2004 | Sanada et al. .............. 720/616 |
| 6,741,537 | B1 | * | 5/2004 | Sanada et al. .............. 720/616 |
| 2002/0097657 | A1 | * | 7/2002 | Seo et al. ................... 369/77.1 |

FOREIGN PATENT DOCUMENTS

| DE | 3202876 A1 | 8/1983 |
| EP | 0 576 253 A2 | 12/1993 |
| EP | 0 816 7215 | 6/1996 |

(Continued)

OTHER PUBLICATIONS

Australian Search Report.
European Search Report, EP 0 40 3110, Mar. 11, 2002.

*Primary Examiner*—William J Klimowicz
(74) *Attorney, Agent, or Firm*—Rader, Fishman & Grauer PLLC; Ronald P. Kananen (57) ABSTRACT

A disk cartridge device includes first and second disk cartridges of different sizes for housing therein disks of different disk diameters and a cassette compartment onto which the first and second disk cartridges are selectively loaded, the cassette compartment including a pair of positioning pins having height-deciding bases for properly placing the first disk cartridge and a pair of positioning pins having height-deciding bases for properly placing the second disk cartridge, wherein the first disk cartridge has stepped escape holes formed on its lower surface to enable itself to escape from the positioning pins by which the second disk cartridge is properly positioned in the loading state when positioning holes of the first disk cartridge are properly fitted into positioning pins and the height is properly decided.

6 Claims, 6 Drawing Sheets

FOREIGN PATENT DOCUMENTS

| | | | |
|---|---|---|---|
| EP | 0 779 618 A1 | | 6/1997 |
| EP | 1100085 A2 | | 5/2001 |
| EP | 1100086 A2 | | 5/2001 |
| EP | 1122731 A2 | | 8/2001 |
| JP | 05135465 A | * | 6/1993 |
| JP | 05225743 A | | 9/1993 |
| JP | 07220355 A | | 8/1995 |
| JP | 08031135 A | * | 2/1996 |
| JP | 08167215 A | | 6/1996 |
| JP | 10003769 A | * | 1/1998 |
| JP | 10125034 A | | 5/1998 |
| JP | 10302431 A | * | 11/1998 |
| JP | 11016318 A | * | 1/1999 |
| JP | 11086488 A | * | 3/1999 |
| JP | 11162069 A | * | 6/1999 |
| WO | 99/41745 | | 8/1999 |

* cited by examiner

DISK CARTRIDGE DEVICE OPERATIVE WITH DISK CARTRIDGES OF DIFFERENT SIZES AND HEIGHT

RELATED APPLICATION

This aprlication is a divisional of application Ser. No. 09/711,274, filed on Nov. 10, 2000 now U.S. Pat. No. 6,741,537.

BACKGROUND OF THE INVENTION

1. Field of the Invention

The present invention relates to a disk cartridge device for recording an information signal on a signal recording layer or reproducing a recorded information signal from the signal recording layer with irradiation of optical beams on the signal recording layer of an optical disk, for example. More particularly, the present invention relates to a so-called compatible type disk cartridge device for selectively loading a plurality of disk cartridges having cartridge housings different in sizes to store disks of different diameters onto a recording and reproducing device by which disk cartridges of different sizes can be properly positioned at and held by positioning pins of the recording and reproducing device without a hitch.

2. Description of the Related Art

As media for recording a variety of information such as audio information or video information, there have hitherto been proposed optical disks for reproducing recorded information from the recording medium or recording information on the recording medium by optical beams. This kind of optical disk can be comprised of a single plate-like disk, and hence it is easy to handle. In addition, since such optical disks are large in recording capacity as compared with recording media such as magnetic tapes, they are now widely applied to recording media of audio information, video information and data processed by computers.

On the other hand, a demand of smaller recording and/or reproducing device using optical recording media such as optical disks is increasing because information processors such as computers do not have a sufficient space to incorporate recording and/or reproducing device.

Furthermore, recording media themselves have to be miniaturized and also have to increase their capacity in order to make the recording and/or reproducing device become small. To fulfill such requirements, there are proposed a plurality of types of disk cartridges including cartridge housings of different sizes to store disks of different diameters as recording media. The assignee of the present application has previously proposed these disk cartridges by as Japanese patent application No. 11-176029.

The above-mentioned disk cartridges are designed to be inserted into their own cartridge insertion slots, and hence recording and reproducing device should be designed in accordance with respective disk cartridges.

For this reason, disk cartridges, which are different in size, cannot be selectively loaded onto a compatible recording and reproducing device.

That is, the height reference position to determine the position in the height direction is not always the same in disk cartridges of different sizes. In particular, in most cases of recording and reproducing device which uses a single spindle motor, it is very difficult to make height reference planes of disk cartridges of different sizes become coincident with each other.

For example, pins of the recording and reproducing device to determine the height when they are brought in contact with the height reference plane often become obstacles against disk cartridges of different sizes in use. That is, pins to determine the height of the disk cartridge of small diameter are not required when the disk cartridge of large diameter is inserted, and hence the disk cartridge of large diameter has to escape from the pins which determine the height. Disk cartridges such as floppy disk, MD (mini disc) and MO (magnetooptical disk) are not provided with a means for avoiding such pins assumed when disk cartridges of different sizes are used by a single recording and reproducing device.

SUMMARY OF THE INVENTION

The present invention is made in order to provide a disk cartridge device by which a plurality of kinds of disk cartridges of different sizes can be located at their respective proper positions in the height direction and selectively loaded onto a single recording and reproducing device.

In order to attain the above-mentioned object, a disk cartridge device according to the present invention includes pairs of positioning pins having bases to determine the height at which disk cartridges of different sizes are respectively properly placed to a recording and reproducing device and positioning holes on one surface of disk cartridges of different sizes, the positioning holes being engaged wth pairs of positioning pins and properly positioned, wherein a disk cartridge of large disk diameter includes escape holes formed on its lower surface to enable it to escape from positioning pins at which the disk cartridge of small disk diameter is properly positioned, under such loading state that the positioning holes of the disk cartridge of large disk diameter are located at said positioning pins at a proper position in the height direction.

With the above-mentioned arrangement, when the disk cartridge of large diameter is located at a proper position in the height direction and thereby loaded onto the recording and reproducing device, the disk cartridge of large diameter can escape from the positioning pins, to which the positioning holes of the small-diameter disk cartridge are fitted, by escape holes. Thus, the disk cartridges, which are different in size, can be located at their own proper positions in the height direction and thereby loaded onto the recording and reproducing device without a hitch.

DESCRIPTION OF THE PREFERRED EMBODIMENTS

A disk cartridge device according to an embodiment of the present invention and which is applicable to two kinds of large and small disk cartridges having different disk diameters will be described below with reference to the drawings.

Figure 1:
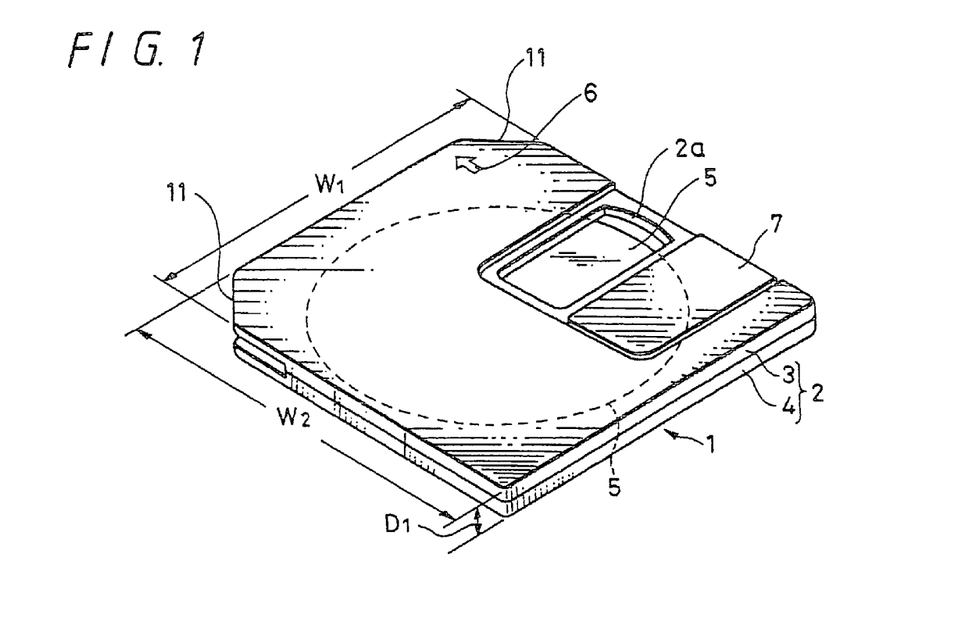
FIG. 1 is a top perspective view showing the large disk cartridge according to the present invention.
Figure 2:
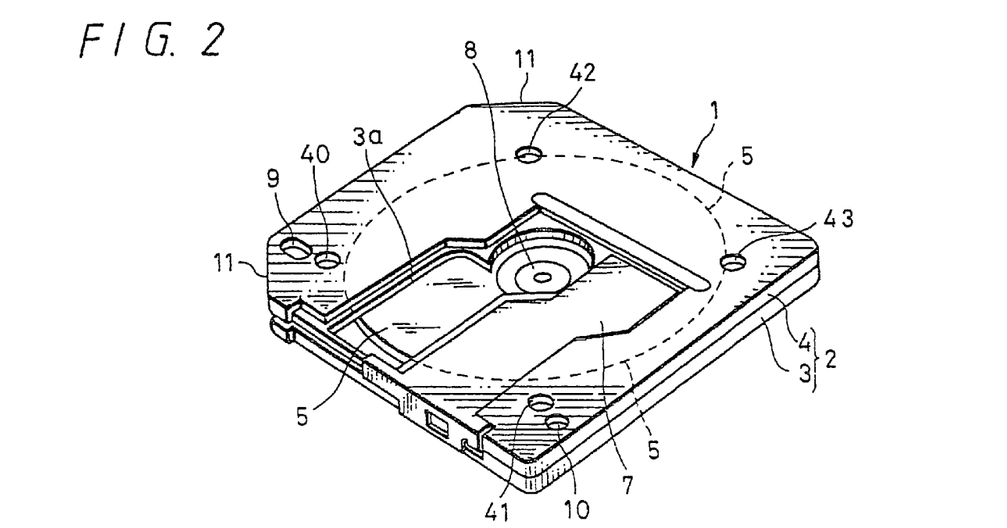
FIG. 2 is a bottom perspective view showing the like large disk cartridge.
Figure 3:
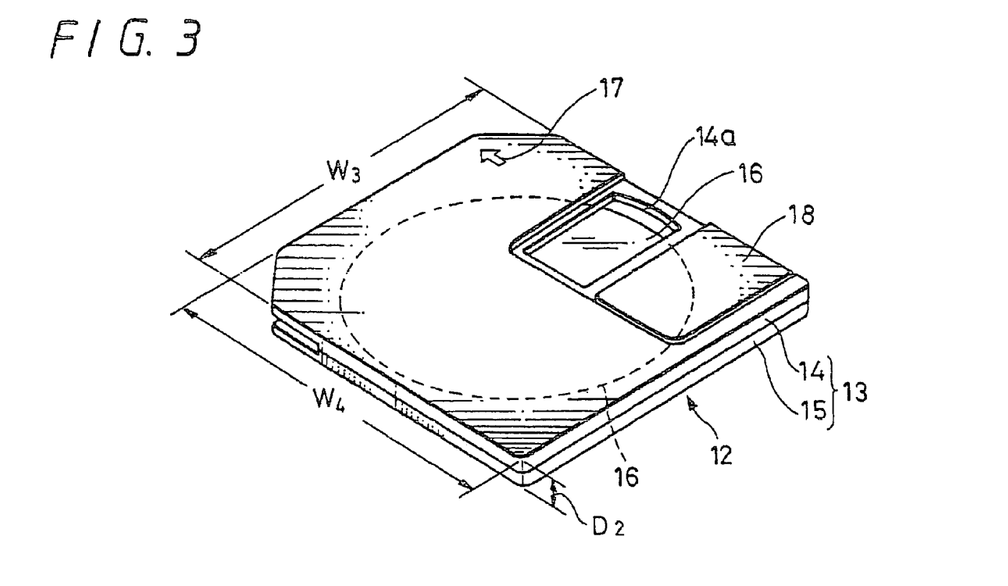
FIG. 3 is a top perspective view showing the small disk cartridge according to the present invention.
Figure 4:
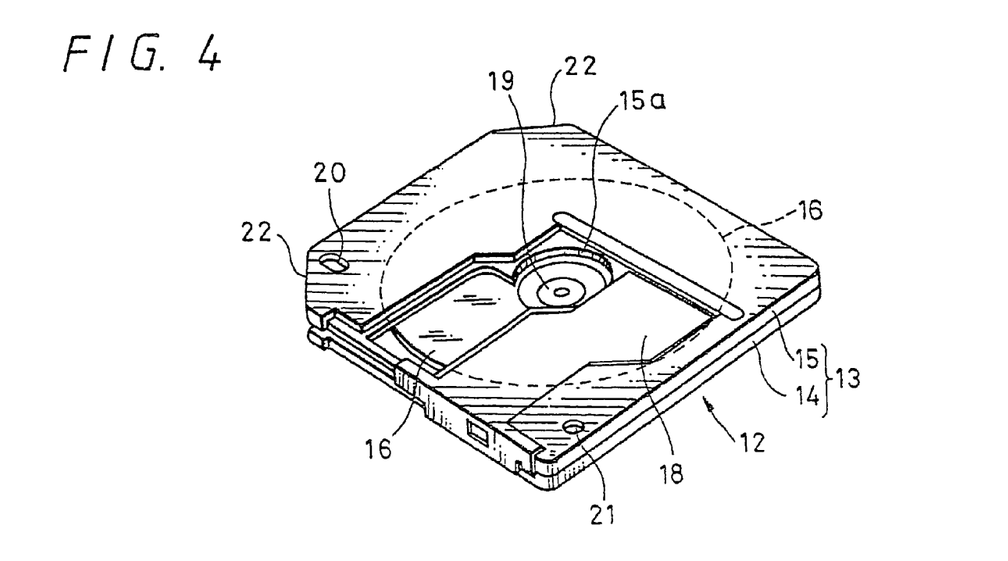
FIG. 4 is a bottom perspective view showing the like small disk cartridge.

FIG. 1 is a top perspective view of a disk cartridge of a large disk diameter while a shutter is being opened (hereinafter referred to as a "first disk cartridge"). FIG. 2 is a bottom perspective view of the like disk cartridge with its shutter being opened. FIG. 3 is a top perspective view of a disk cartridge of a small disk diameter while a shutter is being opened (hereinafter referred to as a "second disk cartridge"). FIG. 4 is a bottom perspective view of the like disk cartridge with its shutter being opened.

A first disk cartridge is generally designated by reference numeral 1, and a cartridge housing 2 is comprised of an upper shell 3 and a lower shell 4 joined at their joint surfaces by high-frequency welding. A disk 5 stored in the first disk cartridge 1 is an optical disk, for example, and its outer diameter is (64.8 mm, by way of example. According to the standardization, the disk housing 2 has dimensions such that a length W1 of one side perpendicular to the insertion direction (shown by an arrow-like marker 6) of the disk cartridge 1 is 72 mm, a length W2 of the other side perpendicular to this side is 68 mm and a thickness D1 is 5 mm.

The above-described first disk cartridge 1 includes a shutter 7 which can slide so as to open and close both surfaces of the cartridge housing 2. While the shutter 7 is being opened, a part of the upper surface of the disk 5 along the direction of diameter is exposed on the upper surface side of the disk cartridge 1 from a window 2a defined on the upper shell 2 and a part of the lower surface (recording layer) of the disk 5 along the direction of diameter also is exposed on the lower surface side of the disk cartridge 1 from a window 3a defined on the lower shell 3. While the shutter 7 is being opened, a chucking plate 8 of the disk 5 is exposed on the lower surface side of the disk cartridge 1.

The first disk cartridge 1 has a positioning hole 9 of an oblong shape bored at one side of the front of the lower shell 3 along the insertion direction and also has a positioning hole 10 of a circular shape bored at the rear of the lower shell in the opposite side of the positioning hole 9. Further, the first disk cartridge 1 has relatively large slanting recessed surfaces 11, 11 formed at respective corner portions of its front in the insertion direction by cutting both of the corner portions obliquely.

A second disk cartridge is generally designated by reference numeral 12. In this case, a cartridge housing 13 also is comprised of an upper shell 14 and a lower shell 15 joined at their joint surfaces by high-frequency welding. A disk 16 stored in the second disk cartridge 12 is an optical disk, and its outer diameter is (50 mm, by way of example. According to the standardization, the disk housing 13 has dimensions such that a length W3 of one side perpendicular to the insertion direction (shown by an arrow-like marker 17) of the disk cartridge 1 is 58 mm, a length W4 of the other side perpendicular to this side is 53 mm and a thickness D2 is 4 mm.

The above-described second disk cartridge 12 includes a shutter 18 which can slide so as to open and close both surfaces of the cartridge housing 13. While the shutter 18 is being opened, a part of the upper surface of the disk 16 along the direction of the diameter is exposed on the upper surface side of the disk cartridge 12 from a window 14a defined on the upper shell 14 and a part of the lower surface (recording layer) of the disk 16 along the direction of the diameter also is exposed on the lower surface side of the disk cartridge 12 from a window 15a defined on the lower shell 15. While the shutter 18 is being opened, a chucking plate 19 of the disk 16 is exposed on the lower surface side of the disk cartridge 12.

The second disk cartridge 12 has a positioning hole 20 of an oblong shape bored at one side of the front of the lower shell 15 along the insertion direction and also has a positioning hole 21 of a circular shape bored at the rear of the lower shell on the opposite side of the positioning hole 20. Further, the second disk cartridge 12 has relatively large slanting recess surfaces 22, 22 formed at respective corner portions of its front in the insertion direction by cutting both of the corner portions obliquely.

Figure 5:
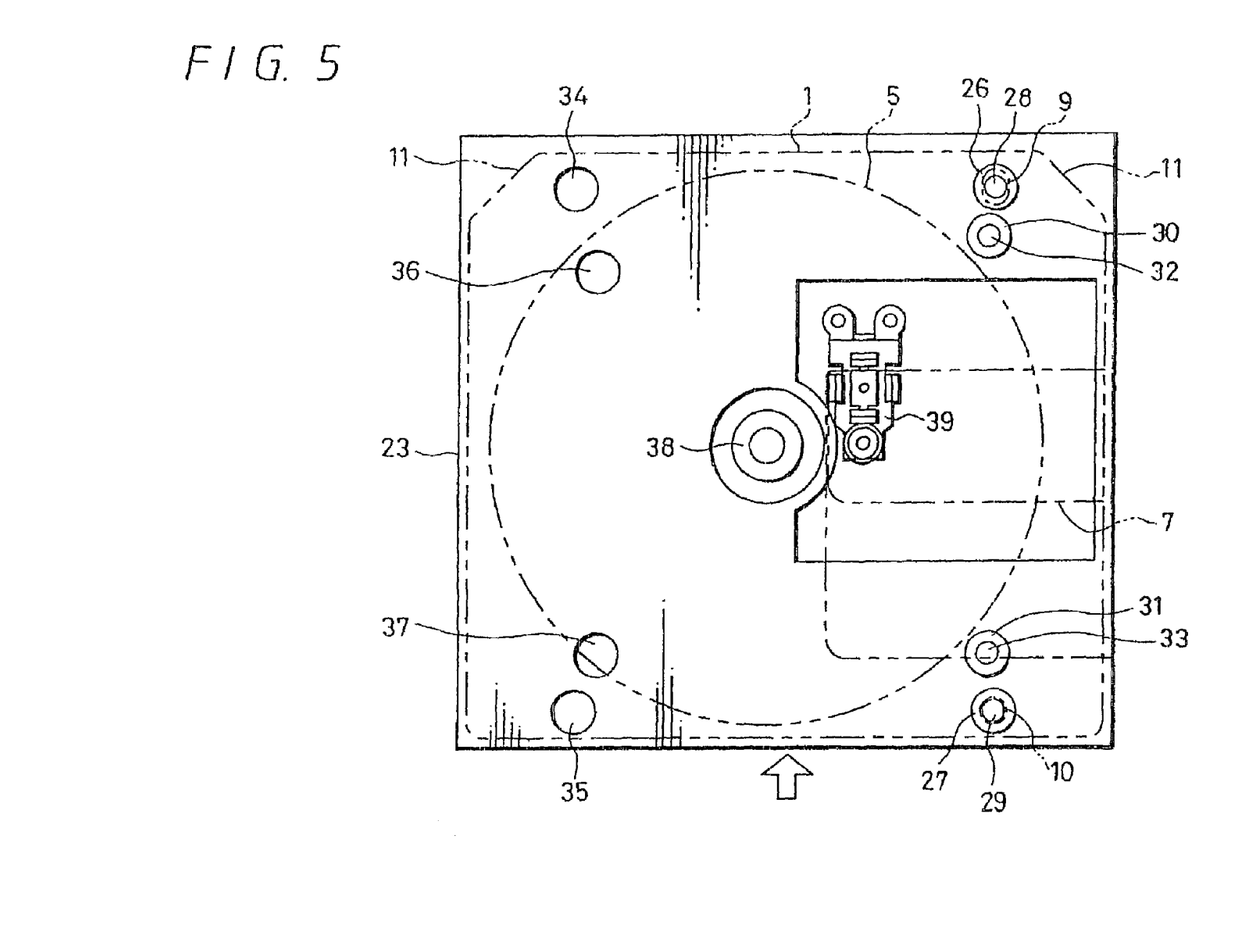
FIG. 5 is a plan view showing the state in which the large disk cartridge is loaded onto the cassette compartment.
Figure 6:
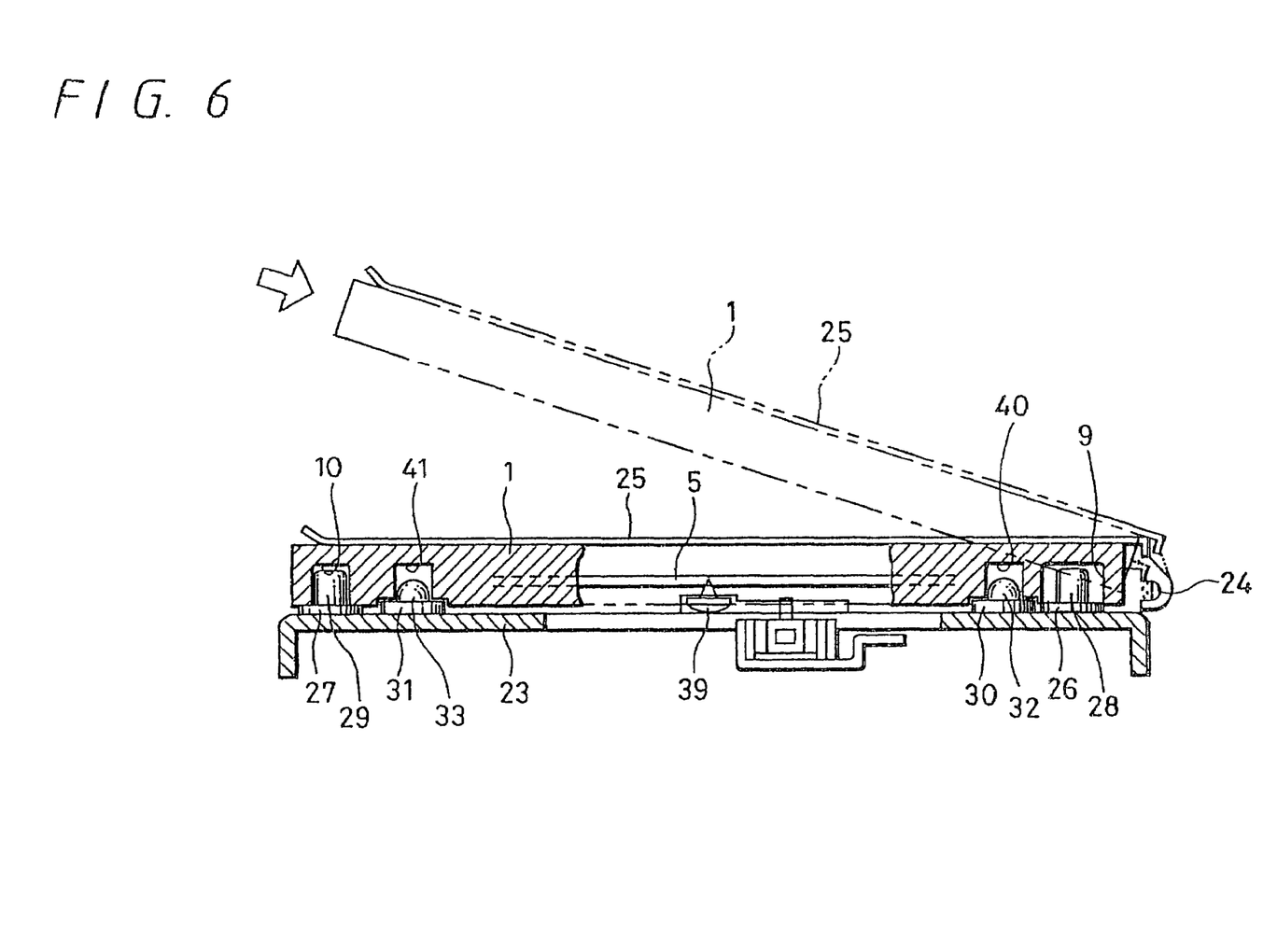
FIG. 6 is a cross-sectional view showing the like state in which the large disk cartridge is loaded onto the cassette compartment.

FIG. 5 is a plan view of a chassis 23 of a cassette compartment (hereinafter referred to as a "cassette compartment") of the recording and reproducing device onto which the above-described disk cartridge is loaded. A phantom line shows the state in which the first disk cartridge 1 is loaded onto the chassis 23. FIG. 6 is a cross-sectional view showing the state in which the first disk cartridge 1 is properly positioned on the chassis 23.

The first disk cartridge 1 is inserted into a pop-up (pop-up type) holder 25, which can swing about a hinge 24 as a fulcrum, from the direction shown by an arrow and is brought to the loading position as the holder 25 swings in the chassis 23 side.

The chassis 23 has a pair of bases 26, 27 for deciding the height of the first disk cartridge 1 formed at one side of the side of the hinge 24 and the other side (right-hand side) of the opposite side of the hinge 24. The two bases 26, 27 includes protruded positioning pins 28, 29 into which the positioning holes 9, 10 for the first disk cartridg 1 may be fitted, respectively.

A pair of bases 30, 31 for deciding the height of the second disk cartridge 12 are formed adjacent to the inside of these positioning pins 28, 29 on the chassis 23. The two bases 30, 31 includes protruded positioning pins 32, 33 into which the positioning holes 20, 21 of the second disk cartridge 12 may be fitted, respectively.

Bases 34, 35 of the same height as that of the bases 26, 27 for deciding the height of the first disk cartridge 1 are formed on the chassis 23 symmetrically to the pair of bases 26, 27 of the first disk cartridge 1. Bases 36, 37 of the same height as that of the bases 30, 31 for deciding the height of the second disk cartridge 12 are formed on the chassis 23 at the position adjacent to the inside of the two bases 34, 35. The bases 30, 31 and 36, 37 for deciding the height of the second disk cartridge 12 are higher than the bases 26, 27 and 34, 35 for deciding the height of the first disk cartridge 1.

In the above-described chassis 23, there are disposed a turntable 38 for chucking and rotating the disk 5 and an optical pickup device 39 for reproducing recorded information from the disk 5 or recording recorded information on the disk.

When the pair of the positioning holes 9, 10 of the first disk cartridge 1 loaded onto the above-described chassis 23 are fitted into the pair of positioning pins 28, 29 on the chassis 23, the first disk cartridge can be properly positioned. At the same time, the height of the lower surface of the first disk cartridge 1 is decided by the respective bases 26, 27, 34, 35, and hence the first disk cartridge 1 can be retained in the horizontal state.

According to the present invention, the first disk cartridge 1 includes stepped escape holes 40, 41 formed thereon to prevent it from being disturbed by the pair of positioning pins 32, 33 and the bases 30, 31 of the second cartridge 12. The first disk cartridge further includes escape holes 42, 43 (see FIG. 2) to enable it to escape from the bases 36, 37 of the second cartridge 12. Thus, in the loading state of the disk cartridge 1, the height of the first disk cartridge can be properly decided and hence the first disk cartridge can be properly located without being hindered by the positioning pins 32, 33 and the bases 30, 31, 36, 37 of the second disk cartridge 12.

Figure 7:
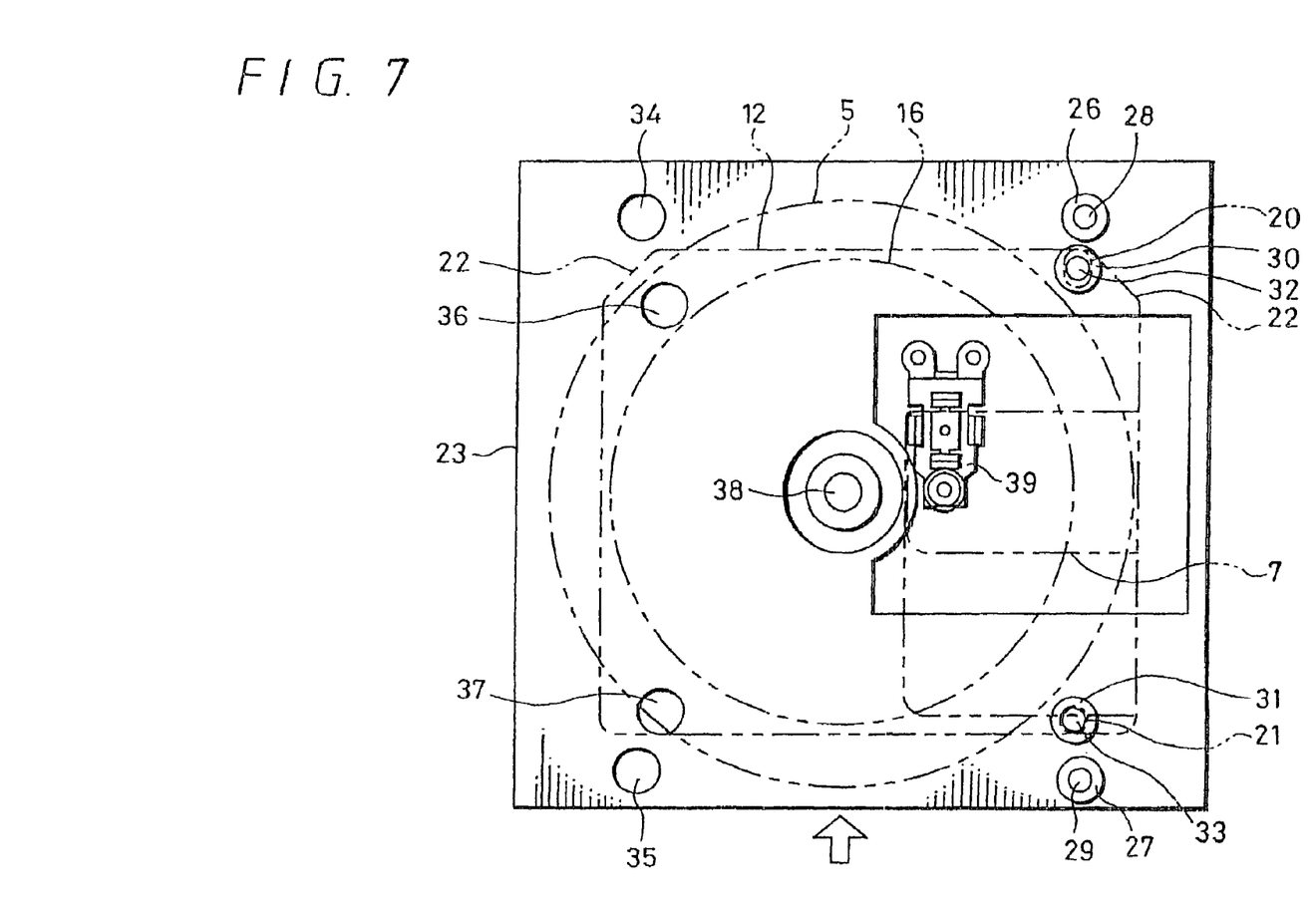
FIG. 7 is a plan view showing the state in which the small disk cartridge is loaded onto the cassette compartment.
Figure 8:
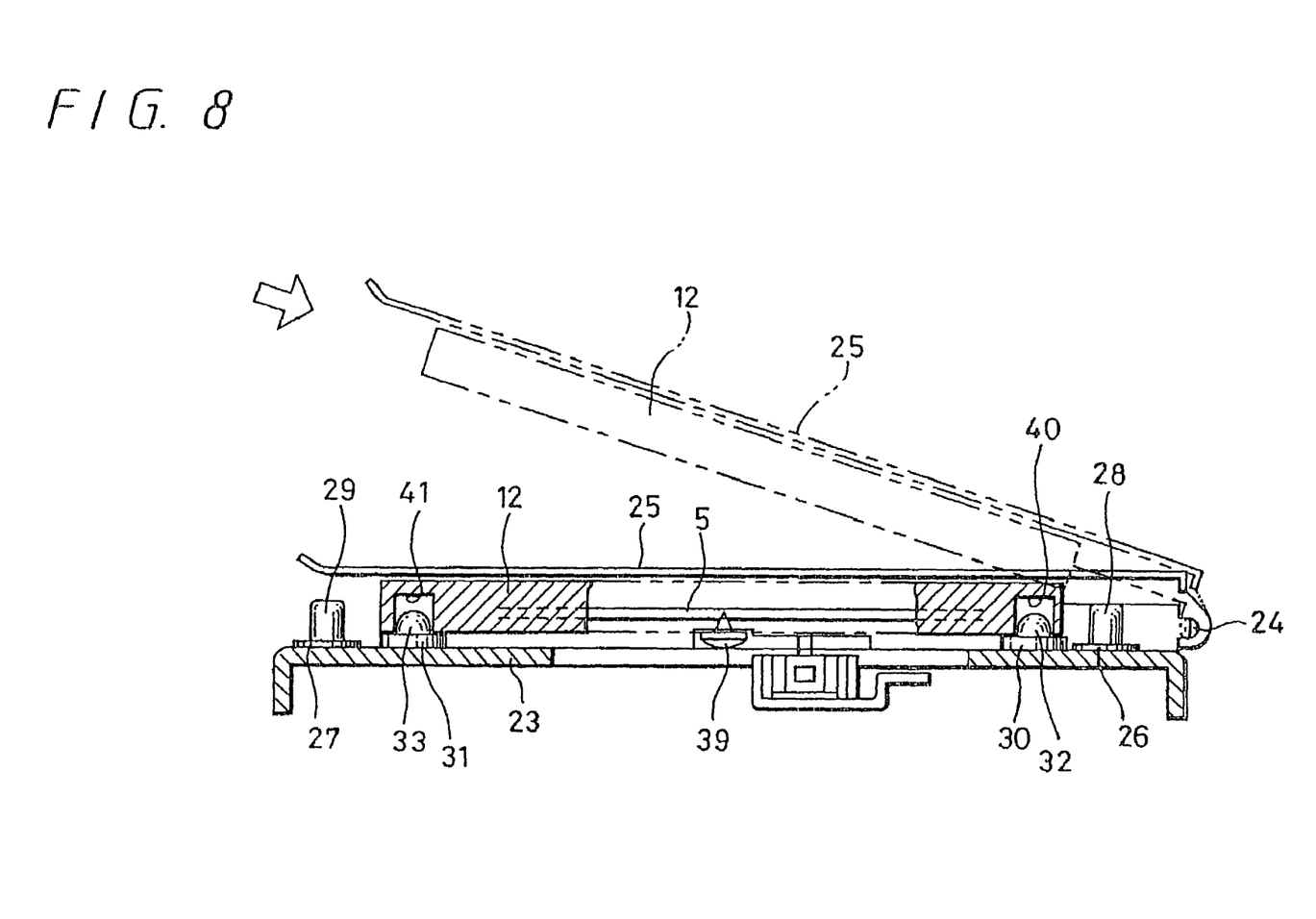
FIG. 8 is a cross-sectional view showing the like state in which the small disk cartridge is loaded onto the cassette compartment.

In FIG. 7, a phantom line shows the state in which the second disk cartridge 12 is loaded onto the chassis 23. FIG. 8 is a cross-sectional view showing the state in which the second disk cartridge 12 is properly positioned on the chassis 23.

When the pair of positioning holes 20, 21 of the second disk cartridge 12 loaded on the chassis 23 are fitted into the pair of positioning pins 32, 33 of the chassis 23, the second disk cartridge can be properly positioned. At the same time, the height of the lower surface of the second disk cartridge 12 is determined by the respective bases 30, 31, 36, 37, and hence the second disk cartridge 12 can be retained in the horizontal state.

While the second disk cartridge 12 is being loaded on the chassis 23, since the positioning pins 28, 29 and the bases 34, 35 of the first disk cartridge 1 are located at the position at which they may not hinder the second disk cartridge 12, special escape holes are not required. Therefore, when the positioning holes 20, 21 are fitted into the positioning pins 32, 33, the second disk cartridge 12 can be properly positioned and its height can be properly decided by the bases 30, 31. It is important that the positioning pins 32, 33 of the second disk cartridge 12 should be located outside the circumference of the disk 5 so as not to hinder the disk 5 when the first disk cartridge 1 is loaded onto the chassis 23. Thus, the second disk cartridge can be loaded on the chassis without hindering the first disk cartridge 1.

The bases for deciding the height of the second disk cartridge 12 are higher than the bases for deciding the height of the first disk cartridge 1. The reason for this is that, since the thickness (4 mm) of the housing 13 of the second disk cartridge 12 is thinner than the thickness (5 mm) of the housing 2 of the first disk cartridge 1, the optical beam from the optical pickup device 39 is adjusted by the height of the bases in such a manner that the optical beam can be focused on the recording layers of the disk 5 and 16 with a highly accurate spot.

As described above, the disk cartridge device according to the present invention can selectively load two kinds of disk cartridges of different sizes into the cassette compartment so that the disks can be recorded or reproduced.

Since the first disk cartridge 1 includes the escape holes to prevent it from being hindered by the positioning pins 32, 33 of the second disk cartridge 12 when the first disk cartridge 1 is loaded and since the positioning pins 32, 33 of the second disk cartridge 12 are located outside the circumference of the disk 5 so as not to hinder the disk 5 when the first disk cartridge 1 is loaded on the chassis 23, the two kinds of disk cartridges of different sizes can be inserted into the disk cartridge device, and hence the disk cartridge device becomes highly reliable.

Since the both disk cartridges 1, 12 have the recess surfaces 11, 22 formed at their respective corner portions in the insertion side, a user can easily recognize the insertion direction of the disk cartridge, and hence the user can be prevented from inserting the disk cartridge in the wrong direction. Even when the user inserts the disk cartridge into the holder 25 in the slanting direction, the recess surfaces 11, 22 can function to guide the disk cartridge in the correct insertion, and hence the disk cartridge can be inserted into the holder 25.

When the large first disk cartridge 1 is inserted into the disk cartridge holder 25, since the left and right side surfaces of the disk cartridge are guided by the holder 25, the first disk cartridge can be inserted into the holder at the accurate position without a special guide mechanism. When on the other hand the small second disk cartridge 12 is inserted into the holder, the holder 25 needs a guide mechanism. This guide mechanism can be easily realized by a mechanism which enables the small second disk cartridge to be evacuated when the large first disk cartridge 1 is inserted into the holder 25.

The present invention is not limited to the above-mentioned embodiment illustrated in the sheets of drawings and can be variously modified without departing from its gist.

While the pair of positioning pins are disposed at the front and rear of the disk cartridge along the insertion direction of the disk cartridge in the embodiment of the present invention, the present invention is not limited thereto, and the pair of positioning pins may be disposed at the left and right of the rear end of the disk cartridge with similar action and effects being achieved. In that case, the pair of positioning pins may be circular positioning pins.

While the present invention is applied to the two kinds of disk cartridges of different sizes in the embodiment of the present invention, the present invention is not limited thereto, and can be easily applied to more than two kinds of disk cartridges of different sizes by disposing escape holes of positioning pins at the position at which the disk cartridge hinders the positioning pins or by disposing positioning pins at the position at which the positioning pins can be escaped from the disk.

The bases of the first and second disk cartridges may have the same height.

As set forth above, in the disk cartridge device according to the present invention, under the loading state in which the height of the disk cartridge is decided when the positioning holes of the disk cartridge of large disk diameter are fitted into the positioning pins and thereby properly positioned, since the disk cartridge of large disk diameter has the escape holes by which the disk cartridge of large disk diameter can be prevented from hindering the positioning pins by which the disk cartridge of small disk diameter is properly positioned, the recording and reproducing device does not require a complicated mechanism. In addition, the large disk cartridge can be loaded on the disk cartridge device under the condition that the large disk cartridge is not hindered by the positioning pins of the small disk cartridge, the height of the large disk cartridge can be properly decided and the large disk. cartridge can be properly located at the predetermined position. Therefore, the disk cartridge device becomes highly reliable.

Since the height of the bases of the disk cartridge of small disk diameter is set to be slightly higher than that of the bases of the disk cartridge of large disk diameter, even when disk cartridges are different in thickness, the optical beam from the optical pickup device can be focused on the recording layer of the disk with an accurate beam spot by a simple mechanism.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A disk cartridge for installation in a disk recording/reproducing apparatus including a chassis with a pair of first positioning pins mounted thereto on respective ones of first height-positioning bases and with a pair of second positioning pins mounted thereto on respective ones of second height-positioning bases, the first height-positioning bases and the second height-positioning bases being different in height relative to one another, the disk cartridge comprising:

a disk;

a cartridge enclosing the disk;

a pair of positioning apertures formed in the cartridge for accepting respective ones of the first positioning pins positioning said cartridge relative to said chassis of the disk recording/reproducing apparatus such that the cartridge rests in contact with and on the respective ones of the first height-position bases; and a pair of escaping apertures formed in the cartridge for accepting respective ones of the second positioning pins without said cartridge contacting and resting on the second height-positioning bases.

2. The disk cartridge as cited in claim 1, wherein the respective ones of said pair of escaping apertures are provided outside of an outer periphery of said disk.

3. The disk cartridge as cited in claim 1, wherein the respective ones of said escaping apertures are provided outside of an outer periphery of said disk and inside the respective ones of said positioning apertures.

4. A disk cartridge, comprising:

a generally rectangularly-shaped housing extending longitudinally and laterally and including an upper shell and a lower shell connected together in a facially opposing manner to form a disk-receiving compartment therebetween; and a disk rotatably mounted to and between the upper and lower shells in the disk-receiving compartment for rotation about an axis of rotation, wherein the lower shell includes a pair of position holes and a pair of escape holes formed therein and extending towards the upper shell, a respective one of the position holes and a respective one of the escape holes being positioned adjacent one another to form two sets of adjacent position holes and escape holes with the respective ones of the position holes disposed radially outwardly relative to the axis of rotation of the disk and the respective escape holes, respective ones of the escape holes having a first cylindrical portion and a second cylindrical portion in communication with the first cylindrical portion, the first cylindrical portion having a first diameter and the second cylindrical portion having a second diameter being smaller than the first diameter.

5. A disk cartridge according to claim 4, wherein each one of the position holes is cylindrically shaped.

6. A disk cartridge according to claim 4, wherein the first cylindrical portion extends axially from the lower shell and into the disk-receiving compartment and the second cylindrical portion is disposed in the disk-receiving compartment and extends coaxially with the first cylindrical portion and between the first cylindrical portion and the upper shell.

* * * * *